(12) United States Patent
Inoue

(10) Patent No.: US 9,050,563 B2
(45) Date of Patent: Jun. 9, 2015

(54) FILTERING DEVICE AND METHOD OF MANUFACTURING SAME

(75) Inventor: Keido Inoue, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 430 days.

(21) Appl. No.: 13/148,959

(22) PCT Filed: Feb. 12, 2010

(86) PCT No.: PCT/JP2010/052105
§ 371 (c)(1),
(2), (4) Date: Aug. 11, 2011

(87) PCT Pub. No.: WO2010/093026
PCT Pub. Date: Aug. 19, 2010

(65) Prior Publication Data
US 2011/0309038 A1    Dec. 22, 2011

(30) Foreign Application Priority Data

Feb. 16, 2009  (JP) ................................. 2009-032872
Nov. 16, 2009  (JP) ................................. 2009-260648

(51) Int. Cl.
*B01D 61/00* (2006.01)
*B01D 63/00* (2006.01)
(Continued)

(52) U.S. Cl.
CPC ................ *B01D 61/04* (2013.01); *B01D 61/16* (2013.01); *B01D 2311/04* (2013.01);
(Continued)

(58) Field of Classification Search
CPC .... B01D 63/00; B01D 29/06; B01D 2321/04; B01D 2321/12; B01D 2321/40; C02F 1/00
USPC .............. 210/652, 767, 971, 411, 259, 257.2, 210/333.01, 333.1, 650, 636, 87, 88.9; 435/6
See application file for complete search history.

(56) References Cited

U.S. PATENT DOCUMENTS 5,476,591 A    12/1995  Green
5,725,777 A *   3/1998  Taylor ........................... 210/650
(Continued)

FOREIGN PATENT DOCUMENTS

CN        2431033 Y    5/2001
CN        1962040 A    5/2007
(Continued)

OTHER PUBLICATIONS

Office Action issued Jun. 28, 2012, in Taiwanese Patent Application No. 099104984 with Partial English translation.
(Continued)

*Primary Examiner* — Ana Fortuna
(74) *Attorney, Agent, or Firm* — Oblon, McClelland, Maier & Neustadt, L.L.P.

(57) ABSTRACT

A filtering device uses a filtration unit for filtering raw water, and the filtration unit has a depth filter forming a filtration membrane thereof and a housing accommodating the depth filter. The housing includes a raw water inlet port for supplying the raw water to the depth filter, a filtrate water outlet port, a gas-supplying port for supplying compressed air into the filtration unit to clean the depth filter, and a drain port for discharging the compressed air together with the raw water. A pore diameter of the filtration membrane is designed within a range of 1 to 25 µm. The filtering device includes a filtrate water supplying passage connected to the filtrate water outlet port, a discharge passage connected to the drain port, a communication passage for communicating filtrate water supplying passage with the discharge passage, and a motor valve for opening and closing the communication passage.

4 Claims, 3 Drawing Sheets

(51) Int. Cl.

| | | |
|---|---|---|
| *B01D 35/00* | (2006.01) | |
| *B01D 35/16* | (2006.01) | |
| *B01D 37/00* | (2006.01) | |
| *B01D 61/04* | (2006.01) | |
| *B01D 61/16* | (2006.01) | |
| *C02F 1/00* | (2006.01) | |
| *C02F 1/44* | (2006.01) | |
| *B01D 61/02* | (2006.01) | |
| *B01D 61/14* | (2006.01) | |
| *C02F 103/08* | (2006.01) | |
| *C02F 103/42* | (2006.01) | |

(52) U.S. Cl.
CPC ............ B01D 2311/16 (2013.01); *C02F 1/004* (2013.01); *C02F 1/44* (2013.01); *C02F 1/441* (2013.01); *C02F 1/444* (2013.01); *C02F 2103/08* (2013.01); *C02F 2103/42* (2013.01); *C02F 2209/005* (2013.01); *C02F 2209/40* (2013.01); *B01D 61/025* (2013.01); *B01D 61/145* (2013.01)

(56) References Cited

U.S. PATENT DOCUMENTS

| | | | | |
|---|---|---|---|---|
| 6,001,254 | A * | 12/1999 | Espenan et al. ............... | 210/636 |
| 6,387,271 | B1 * | 5/2002 | Geibel et al. ................... | 210/651 |
| 7,326,555 | B2 * | 2/2008 | Konz et al. ..................... | 435/239 |
| 7,776,224 | B2 | 8/2010 | Okamoto et al. | |
| 8,158,002 | B1 * | 4/2012 | Lupton et al. .................. | 210/650 |
| 8,163,872 | B2 * | 4/2012 | Aassveen et al. ............... | 530/322 |
| 2003/0042201 | A1 * | 3/2003 | Sizelove et al. ............... | 210/639 |
| 2004/0118780 | A1 | 6/2004 | Willman et al. | |
| 2004/0173532 | A1 | 9/2004 | Scharstuhl et al. | |
| 2005/0029204 | A1 | 2/2005 | Schwartzkopf | |
| 2005/0127011 | A1 | 6/2005 | Schwartzkopf | |
| 2007/0102347 | A1 | 5/2007 | Matsushiro et al. | |
| 2007/0207461 | A1 * | 9/2007 | Weggeman et al. ............... | 435/6 |
| 2008/0257824 | A1 | 10/2008 | Campanile et al. | |
| 2009/0050565 | A1 | 2/2009 | Muralidhara et al. | |
| 2009/0127207 | A1 | 5/2009 | Okamoto et al. | |
| 2009/0266762 | A1 | 10/2009 | Ito et al. | |
| 2009/0274596 | A1 | 11/2009 | Takahashi et al. | |
| 2010/0163495 | A1 * | 7/2010 | Merino et al. ................. | 210/741 |
| 2011/0309038 | A1 * | 12/2011 | Inoue ............................ | 210/791 |

FOREIGN PATENT DOCUMENTS

| | | |
|---|---|---|
| CN | 101193824 A | 6/2008 |
| DE | 20 2005 005 118 U1 | 7/2005 |
| EP | 1 431 250 A2 | 6/2004 |
| JP | 60-024313 | 2/1985 |
| JP | 60-124617 | 7/1985 |
| JP | 2-61407 U | 5/1990 |
| JP | 03-030806 A | 2/1991 |
| JP | 4-305209 A | 10/1992 |
| JP | 6-142417 A | 5/1994 |
| JP | 07-222988 | 8/1995 |
| JP | 9-85258 A | 3/1997 |
| JP | 2000-117013 A | 4/2000 |
| JP | 2001-170416 | 6/2001 |
| JP | 2002 096064 | 4/2002 |
| JP | 2002-355678 | 12/2002 |
| JP | 2003-275506 A | 9/2003 |
| JP | 2005-508734 A | 4/2005 |
| JP | 2006-82031 A | 3/2006 |
| JP | 2006-142261 A | 6/2006 |
| JP | 2007-216181 A | 8/2007 |
| JP | 2007-284531 A | 11/2007 |
| JP | 2007 533429 | 11/2007 |
| JP | 2007-325983 A | 12/2007 |
| JP | 2007-325994 | 12/2007 |
| JP | 2007 326065 | 12/2007 |
| JP | 2008-136886 | 6/2008 |
| JP | 2008-142597 | 6/2008 |
| JP | 2009-297610 | 12/2009 |
| TW | 200838601 | 10/2008 |
| TW | M345640 | 12/2008 |
| WO | WO 95/30471 A1 | 11/1995 |
| WO | WO 02/076590 A2 | 10/2002 |
| WO | WO 03/041829 A2 | 5/2003 |
| WO | WO 2006/108025 A2 | 10/2006 |
| WO | WO 2006/132157 | 12/2006 |
| WO | 2007 097046 | 8/2007 |
| WO | WO 2007/130029 A1 | 11/2007 |
| WO | WO 2007/142068 A1 | 12/2007 |

OTHER PUBLICATIONS

Office Action issued Jun. 28, 2012, in Taiwanese Patent Application No. 099104983 with Partial English translation.
International Search Report issued Mar. 30, 2010 in PCT/JP10/052105 filed Feb. 12, 2010.
Office Action issued Nov. 28, 2013 in Chinese Patent Application No. 201080007901.3 (with partial English translation).
Office Action issued Sep. 3, 2013 in Japanese Patent Application No. 2009-185223 with English language translation.
Office Action issued Sep. 3, 2013 in Japanese Patent Application No. 2009-205570 with English language translation.
Office Action issued Sep. 24, 2013 in Japanese Patent Application No. 2010-029557 with English language translation.
Extended European Search Report issued Sep. 30, 2013 in Patent Application No. 10741303.1.
Office Action issued Oct. 8, 2013 in Japanese Patent Application No. 2009-260648 with English language translation.
Chinese Office Action issued Dec. 18, 2013, in China Patent Application No. 201080007902.8 (with English Summary).
Decision of Rejection issued Apr. 1, 2014 in Japanese Application No. 2010-029557 (with English Summary of Decision of Rejection).
Third Office Action issued Apr. 1, 2014 in Chinese Patent Application No. 201080007902.8 (with English Summary of Third Office Action).
Third Office Action issued Apr. 2, 2014 in Chinese Patent Application No. 201080007901.3 (with English Summary of Third Office Action).
Decision of Rejection issued Jul. 7, 2014 on Corresponding Chinese Patent Application No. 2014070201142500 with English translation of relevant portion.
Decision of Rejection issued Aug. 19, 2014 in Chinese Patent Application No. 201080007901.3 with English Summary and English Translation of Category of Cited Documents.
Communication pursuant to Article 94(3) EPC issued Jun. 11, 2014 on Corresponding European Patent Application No. 10741303.1.
Notification of Reason(s) for Rejection issued Jul. 1, 2014 on Related Japanese Application No. 2009-185223 with English translation of relevant portion.
Notification of Reason(s) for Rejection issued Jul. 1, 2014 on Related Japanese Application No. 2009-205570 with English translation of relevant portion.
Decision of Rejection issued Jul. 7, 2014 on Corresponding Chinese Patent Application No. 201080007902.8 with English translation of relevant portion.
Decision of Grant issued Jul. 8, 2014 on related Japanese Application No. 2010-029557.
Notification of Reason(s) for Rejection issued Aug. 12, 2014 on Corresponding Japanese Application No. 2009-260648 with English translation of relevant portion.
Combined Office Action and Search Report issued Jun. 5, 2013 in Chinese Patent Application No. 201080007901.3 with Partial English language translation and English translation of categories of cited documents.
Combined Office Action and Search Report issued Jun. 20, 2013 in Chinese Patent Application No. 201080007902.8 with Partial English language translation and English translation of categories of cited documents.

* cited by examiner

Fig. 3

| STEPS | FILTRATION PUMP | FIRST AUTOMATIC SWITCHING VALVE | SECOND AUTOMATIC SWITCHING VALVE | THIRD AUTOMATIC SWITCHING VALVE | FOURTH AUTOMATIC SWITCHING VALVE | FIFTH AUTOMATIC SWITCHING VALVE |
|---|---|---|---|---|---|---|
| PRIMING | ○ | ○ | × | × | × | ○ |
| FILTERING | ○ | ○ | ○ | × | × | × |
| PRESSURIZING | × | × | × | ○ | × | × |
| BACKWASHING | × | × | × | ○ | ○ | × |

○: OPERATING CONDITION OR OPEN CONDITION    ×: HALT CONDITION OR CLOSE CONDITION

FILTERING DEVICE AND METHOD OF MANUFACTURING SAME

CROSS REFERENCE TO THE RELATED APPLICATION

This application is based on and claims Convention priority to Japanese patent applications No. 2009-32872, filed Feb. 16, 2009, and No. 2009-260648, filed Nov. 16, 2009, the entire disclosure of both of which are herein incorporated by reference as a part of this application.

BACKGROUND OF THE INVENTION

1. Field of the Invention

The present invention relates to a filtering device for filtering water of a kind used in, for example, pools and spas as it is recirculated or filtering water of a kind used in, for example, in a desalination plant.

2. Description of Related Art

In general, a sand filtering device is employed in circulatory filtration of water used in, for example, a bathtub or a pool. The sand filtering device is of such a structure which makes use of a gravel layer and a sand layer deposited thereon, through both of which water is allowed to pass so that finely divided particles suspended in the water can be removed. It has, however, been found that the device itself is bulky in size, thus involving a problem that a relatively large space for installation is required.

Also, other than the sand filtering device, a membrane filtering device is known, in which a membrane made of a synthetic resin of a kind capable of trapping finely divided particles is employed. As compared with the sand filtering device, the membrane filtering device is relatively small in size and can, therefore, be installed in a relatively small space. See, for example, the Patent Document 1 listed below.

In a seawater desalination plant, the ultrafiltration membrane or the reverse osmosis membrane or the like is employed, but the sand filtering device is often used in the front stage of the ultrafiltration membrane or reverse osmosis membrane.

PRIOR ART LITERATURE

[Patent Document 1] JP Laid-open Patent Publication No. 2002-096064

For the filter used in the membrane filtering device, a surface filter and a depth filter are available. The surface filter is a filter capable of trapping foreign matter on a surface of the filtering medium and is used in, for example, a high precision filtration in which the filtering surface area is increased to reduce the filtering resistance so that the amount of trapping the foreign matter can be increased. The surface filter can be repeatedly reused if it is backwashed. However, as compared with the depth filter, the amount of foreign matter trapped thereby is relatively small and, therefore, the surface filter is not suited for use in filtration of water containing a relatively large amount of contaminants. Also, since the surface filter is expensive, the application thereof is limited.

On the other hand, the depth filter is a filter of a design in which the foreign matter can be trapped in interstices in the filtering medium. Since the depth filter exhibits a capability of trapping a relatively large amount of foreign matter, it is used also in filtration of water containing a relatively large amount of contaminants. Although as compared with the surface filter the depth filter is relatively inexpensive, backwashing of the depth filter is rather difficult to achieve as compared with that of the surface filter because the foreign matter is trapped in the interstices, not on the surface, of the filtering medium. If the depth filter is used for filtration after it has been backwashed, it may often occur that ultrafine particles caught somewhere in the interstices of the filtering medium during the backwashing will accumulate immediately after the filtration resumed, resulting in that the filtrate water may be suspended. Since those ultrafine particles have a particle size smaller than a pore size of the depth filter, there should be no problem even if they remain in the filtrate water, but depending on the application, such a suspension will possibly pose a detrimental problem.

In the seawater desalination plant, the seawater is treated by means of the reverse osmosis membrane, the sand filtering device is often concurrently used as a pre-filter in order to remove various particulate matters contained in the seawater. However, it has been found occurring quite often that once planktons, algae, and/or larvae of crustacean and shells, all present in the seawater, stick to the sand filtering device, the sand filtering device may fail to operate properly when they grew up and/or proliferate.

SUMMARY OF THE INVENTION

In view of the foregoing, the present invention has been devised to substantially eliminate the problems and inconveniences inherent in the prior art filtering systems and is intended to provide a filtering device including a filtration unit effective to minimize the initial introduction cost and the maintenance and operation cost, and further compact in structure, effective to suppress suspension of the filtrate water. The present invention has an additional object to provide the filtering device of the kind referred to above, which can be used as a substitute of the sand filtering device or as a pre-filter for the sand filtering device thereby to increase the lifetime of the filtering system as a whole.

In order to accomplish the foregoing object, the present invention provides a filtering device including a primary filtration unit for filtering a raw water, which unit includes a filtering medium and a housing for accommodating the filtering medium. The housing referred to above has defined therein a raw water supplying port for supplying the raw water therethrough into the filtering medium, a filtrate water outlet port, a fluid supplying port for supplying a fluid for backwashing therethrough into the filtering medium and a drain port for discharging therethrough the fluid used to backwash the filtering medium and the raw water. The filtering medium referred to above includes a depth filter having a pore size within the range of 1 to 25 μm. The filtering device also includes a filtrate supplying passage fluid connected with the filtrate water outlet port, a drain passage fluid connected with the drain port, a communication passage for communicating the filtrate supplying passage with the drain passage and a switching valve for selectively opening or closing the communication passage.

For the fluid for backwashing use, a gas or a liquid is employed, but the use of the gas is preferred. More preferably, an inert gas such as, for example, air and/or nitrogen is preferred for that fluid. If the pore size is not greater than 1 μm, clogging will occur and the pressure loss will increase. On the other hand, if the pore size exceeds 25 μm, suspended matter will become noticeable in the water.

The pore size referred to above is defined as follows. A liquid medium is prepared by adding particles having a constant diameter, preferably spherical beads of polystyrene or glass, into water in a quantity of 10,000 particle per litter; and then supplied to the depth filter (60 mm in outer diameter, 30 mm in inner diameter and 250 mm in length) under the condition of 25° C. at a rate of 1.0 mm³/h. The number of the particles passed through the depth filter is measured by means of an optical counter to obtain the respective numbers of the particles before the supply across the depth filter and after the discharge from the depth filter. The trap rate (R %) is obtained by dividing the difference between those two numbers by the number of the particles present in the liquid medium before the latter has been passed across the depth filter with respect to each of a plurality of the constant particle diameters. Based on the trap rates so obtained, a value of the diameter (S) of the particles exhibiting R=90% is determined according to the following formula:

$$R=100/(1-m\times\exp\{-a\times\log(S)\}) \quad (1)$$

in which m and a are constants determined by the properties of the depth filter. The diameter S so determined is defined as the pore size.

By way of example, if the particle diameter is 1 μm, the measurement can be accomplished when the liquid medium added with the spherical polystyrene microparticles (10,000 microparticles/liter) is supplied through the depth filter (60 mm in outer diameter, 30 mm in inner diameter and 250 mm in length) under the above described condition.

According to the foregoing construction, since the depth filter having a pore size within the range of 1 to 25 μm is employed, not only can suspended matter of a noticeable particle size be sufficiently removed, but also the initial introduction cost can be suppressed as compared with that in the use of a surface filter. Also, since the employment of the backwashing is effective to recuperate the filtering capability of the depth filter, the frequency of replacement of the depth filter can advantageously be minimized to thereby suppress the cost incurred in maintenance and operation of the filtering device. Yet, since the use has been made of the communication passage fluid connecting the filtrate water supplying passage with the drain passage and the switching valve for selectively opening or closing this communication passage, the filtrate water containing the ultrafine particles accumulated can be discharged to the drain passage by opening the switching valve immediately after the backwashing thereby preventing the suspended or muddy filtrate water to be supplied. In addition, if this filtering device is used as a substitute of the sand filtering device or as a pre-filter for the sand filtering device, deposition of planktons or the like existing in water to the sand filtering device can be prevented to thereby increase the lifetime of the filtering system as a whole.

In the present invention, the use may be made of a secondary filtration unit for filtering again the filtrate water, which has been filtered by the primary filtration unit, by means of a filtering medium including an ultrafiltration membrane or a reverse osmosis membrane. According to this construction, since the filtering medium used in the primary filtration unit and that in the secondary filtration unit can be backwashed with the common backwashing fluid, the equipment can be simplified further. Also, the load imposed on the filtering medium in the form of an ultrafiltration membrane or a reverse osmosis membrane can be reduced and, therefore, the lifetime of the expensive filtering medium can be increased.

In the present invention, the fluid supplying port and the filtrate water outlet port are preferably the same. According to this construction, the fluid supplying port and the filtrate water outlet port are commonly shared with each other, allowing the structure to be simplified.

In the present invention, the drain port and the raw water supplying port are preferably the same. According to this construction, the drain port and the raw water supplying port are commonly shared with each other, allowing the structure to be simplified.

The present invention also provides a method of making a filtrate water with the use of a filtering device of the present invention, which method includes a priming step of discharging the fluid, together with the raw water, through the filtration unit, then through the communication passage and finally through the drain passage in a condition in which the switching valve is opened while the supply of the filtrate water from the filtering medium and the supply of the fluid for backwashing towards the filtering medium are interrupted; a filtering step of supplying the raw water to the primary filtration unit to cause the filtrate water to be transported towards the filtrate water outlet port in a condition in which the discharge of the raw water from the filtering medium and the supply of the fluid for backwashing towards the filtering medium are interrupted; a backwashing step of supplying the fluid for backwashing from a filtrate water side towards the filtering medium and then discharging the fluid from the drain port through the drain passage in a condition in which the supply of the filtrate water is interrupted.

According to the above described construction, since the backwashing is effective to recuperate the filtering capability of the filtering medium and then to allow it to be reused further, the cost incurred in maintenance and operation can be suppressed. Also, since during the priming step the filtrate water after the backwashing is discharged through the communication passage and then through the drain passage, there is no possibility that the filtrate water may be suspended immediately after the backwashing.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3 is a chart showing the sequence of operation of the filtering device.

DESCRIPTION OF PREFERRED EMBODIMENTS

Figure 1:
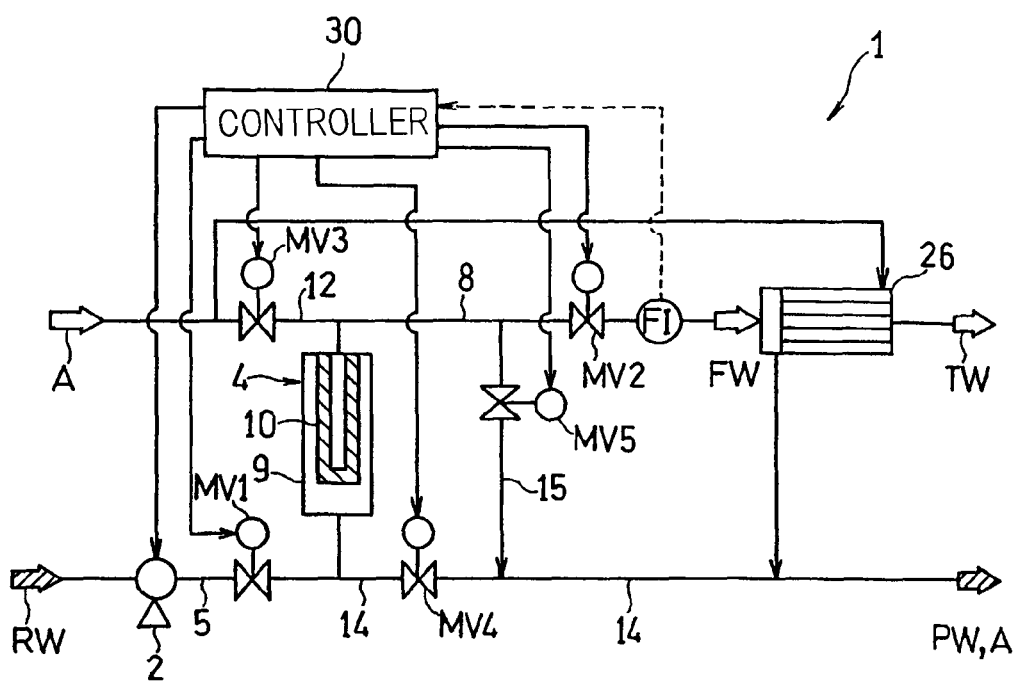
FIG. 1 is a diagram showing a fluid circuit of a filtering device according to a first preferred embodiment of the present invention.

Hereinafter the present invention will be described in detail in connection with a preferred embodiment thereof with reference to the accompanying drawings. In particular, FIG. 1 schematically illustrates a fluid circuit of a filtering device, including a filtration unit, according to the preferred embodiment of the present invention.

The filtering device 1 includes a filtration pump 2 for pumping a raw water RW from a water source to the system and a primary filtration unit 4 for filtering the raw water RW so supplied from the water source. The primary filtration unit 4 is fluid connected with a raw water passage 5, through which the raw water RW is supplied thereto from the filtration pump 2, a filtrate water supplying passage 8 for discharging a filtrate water FW from the primary filtration unit 4, and a drain passage 14 for discharging the raw water RW within the primary filtration unit 4 together with a compressed air A as will be described later. The filtrate water supplying passage 8 is in turn fluid connected with a fluid supplying passage 12 through which the compressed air A is supplied into the primary filtration unit 4. The filtrate water supplying passage 8 and the drain passage 14 are fluid communicated with each other through a communication passage 15. As a matter of course, those passages 5, 8, 12, 14 and 15 referred to above are defined by any known tubes or pipes. The primary filtration unit 4 includes a generally or substantially cylindrical housing 9 accommodating therein a depth filter 10 which is a filtering medium forming a filtering membrane.

A first automatic switching valve MV1 that functions as a flow control valve for regulating the flow of the raw water is disposed on the raw water passage 5; a second automatic switching valve MV2 that functions as a conveyance valve for the filtrate water FW is disposed on the filtrate water supplying passage 8; and a flow meter FI is disposed on a portion of the filtrate water supplying passage 8 downstream of the second automatic switching valve MV2 with respect to the direction of flow of the filtrate water FW.

Also, a secondary filtration unit 26 having a hollow fiber membrane (not shown) of a pore size not greater than 1 μm, which is a ultrafiltration membrane, is disposed on a portion of the filtrate water supplying passage 8 downstream of the flow meter FI. This secondary filtration unit 26 is used to filter the filtrate water FW, discharged from the first filtration unit 4, to purify or substantially purify the latter highly precisely to thereby provide a treated water TW. It is, however, to be noted that the filtering membrane used in this secondary filtration unit 26 may not be necessarily limited to the hollow fiber membrane referred to above, but may be employed in the form of any known ultrafiltration membrane.

It is also to be noted that in place of the ultrafiltration membrane, a reverse osmosis membrane may be employed. Yet, depending on the particular application of the filtering device, in place of the use of the secondary filtration unit 26, one or a mixture of medical agents for sterilization may be added to the filtrate water FW then flowing through that portion of the filtrate water supplying passage 8 downstream of the flow meter FI, or the secondary filtration unit 26 may be dispensed with.

The fluid supplying passage 12 has a third automatic switching valve MV3 disposed thereon, which valve MV3 functions as a compressed air introducing valve, and, on the other hand, the drain passage 14 has a fourth automatic switching valve MV4 disposed thereon so as to function as a drain valve. The communication passage 15 referred to previously has a fifth automatic switching valve MV5 disposed thereon, which valve MV5 is used to selectively open or close the communication passage 15.

Specifically, the communication passage 15 is branched off from a portion of the filtrate water supplying passage 8 upstream of the second automatic switching valve MV2 with respect to the direction of flow of the filtrate water FW and is fluid connected with a portion of the drain passage 14 downstream of the fourth automatic switching valve MV4. The fluid supplying passage 12 has one end fluid connected with an air compressor (not shown) and the opposite end fluid connected with a secondary side of an upper section of the primary filtration unit 4, i.e., a secondary chamber of the primary filtration unit 4.

The filtration pump 2 and the first to fifth automatic switching valves MV1 to MV5 are driven under the control of a controller 30. Also, the flow meter FI provides an output thereof to the controller 30. For each of the first to fifth automatic switching valves MV1 to MV5, a pneumatically operated valve, a motor valve, an electromagnetical value, or a manual valve with no controller can be employed.

The filtering device as a whole can be simplified in structure if the same fluid is used for backwashing the hollow fiber membrane in the secondary filtration unit 26 and also for backwashing the depth filter 10 employed in the primary filtration unit 4. Also, where any existing filtering device of a type including, for example, a sand filtering device and a secondary filtration unit having the backwashing function is available, any existing fluid for backwashing use can be employed when the sand filtering device employed in the existing filtering device is replaced with the primary filtration unit 4 of the type employed in the embodiment as described above. Even in the existing filtering device of a type utilizing no secondary filtration unit, the present invention can be applied to such existing filtering device, provided that a filtering device is replaced with the primary filtration unit 4 of the type employed in the embodiment, a backwashing equipment is introduced in such existing filtering device and a communication passage is added to fluid connect the existing filtering passage with the existing drain passage together.

Figure 2:
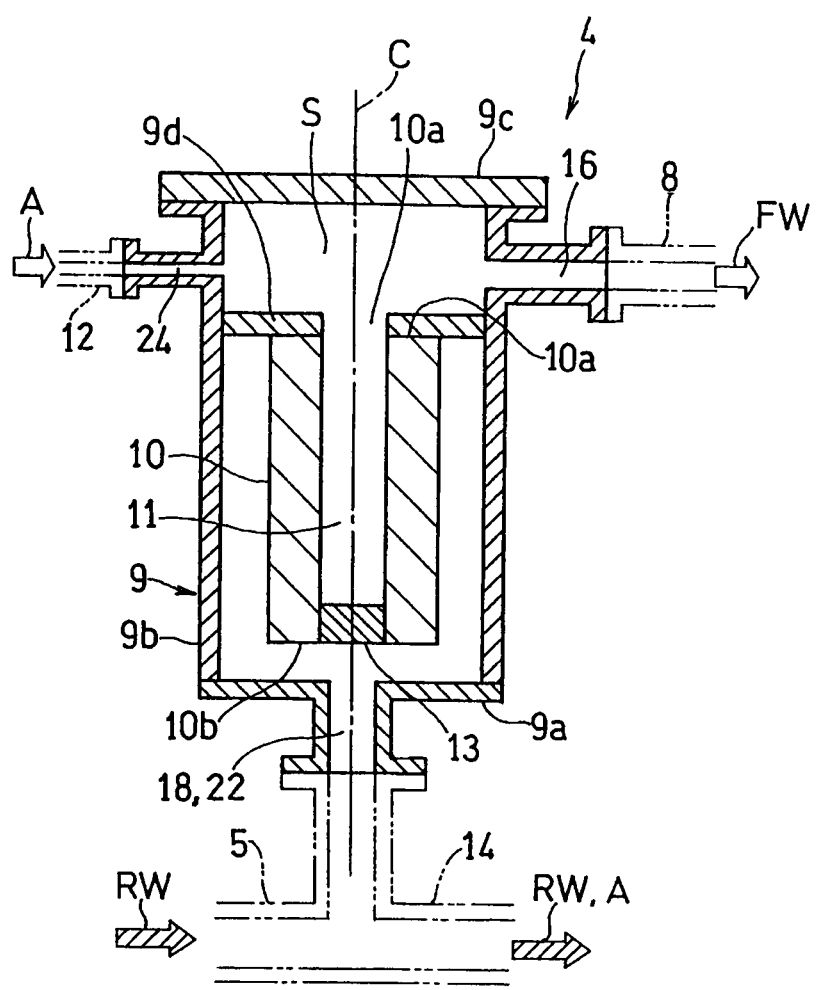
FIG. 2 is a longitudinal sectional view showing, on an enlarged scale, a filtration unit employed in the filtering device.

As best shown in FIG. 2, the depth filter 10 is of a hollow cylindrical configuration having one end open and the other end closed by a lid member 13, and an open end 10, which is one end thereof, is oriented towards a filtrate water outlet port 16 to thereby communicate a hollow 11 of the depth filter 10 with the filtrate water outlet port 16. As the raw water RW flows through the depth filter 10 in a direction radially inwardly thereof, foreign matter contained in the raw water RW is trapped by pores inside the filter to thereby provide the filtrate water FW. This depth filter 10 is also removably accommodated within a housing 9 of the primary filtration unit 4 and is so disposed with the open end 10*a* positioned above a closed end 10*b*, which is the other end thereof. In the illustrated embodiment, the primary filtration unit 4 is so arranged while a center line C extending in a lengthwise direction of the depth filter 10 is oriented in a vertical direction, but the primary filtration unit 4 may be oriented diagonally upwardly so as to be oriented towards the filtrate water outlet port 16.

The housing 9 of the primary filtration unit 4, which is cylindrical in shape, is made up of a first or lower end wall 9*a*, a peripheral wall 9*b* and a second or upper end wall 9*c*. The upper end wall 9*a* of the housing 9 is formed with a raw water supplying port 18, which is fluid connected with the raw water passage 5, and a drain port 22, which is fluid connected with the drain passage 14, and, on the other hand, the lower end wall 9*c* is formed with a fluid supplying port 24, which is fluid connected with the fluid supplying passage 12, and a filtrate water outlet port 16 fluid connected with the filtrate water supplying passage 8. In other words, the filtrate water outlet port 16 is disposed at the topmost portion of the housing 9. In the illustrated embodiment, the raw water supplying passage 18 and the drain port 22 are the same, but they may be provided separately. Also, the filtrate water outlet port 16 and the fluid supplying port 24 may be provided separately.

The annular bottom plate 9*d* is provided in a portion of the peripheral wall 9*b* of the housing 9 axially below the fluid supplying port 24 and the filtrate water outlet port 16, and the depth filter 10 has its open end 10*a* supported by this bottom plate 9*d*. In other words, a space S is defined within the housing 9 at a location between the end wall 9*c* and the bottom plate 9d with the fluid supplying port 24, the filtrate water outlet port 16 and the open end 10a of the depth filter 10 communicated with such space S, and the hollow 11 of the depth filter 10 is also communicated with this space S. In other words, the open end 10a is disposed above the closed end 10b. The raw water supplying port 18 and the drain port 22 are defined on the primary side of the depth filter 10, that is, a filtrate side and the filtrate water outlet port 16 is defined on the secondary side thereof, that is, a raw water side.

The depth filter 10 is a cylindrical filter of an external pressure type and has a generally U shaped section. This depth filter 10 may be employed in the form of a cylindrical laminated type that is prepared by a web of synthetic or chemical fibers, a non-woven fabric, paper or textile fabric welded and/or molded to render it represent a cylindrical shape. For the synthetic fibers, those are prepared from polyolefin, polyester, a thermofusible polymer such as, for example, nylon or an ethylene vinyl alcohol copolymer, or such a polymer as, for example, polyvinyl alcohol or polyacrylonitrile. Of them, polyolefin and polyester, more specifically polypropylene can be suitably employed particularly where backwashing with gas is desired to be carried out, because they can exhibit an excellent fluid draining capability. Also, the filter is preferred to have such a structure in which in a direction thicknesswise of the filters, the density and/or the fineness are changed such that the density of the fibers is low or the fineness is high on an external side (a raw water inflow side) of the filter. For the depth filter 10, other than that described above, a so-called bobbin filter in which filaments or spun yarns are wound spirally, or a resin molded type which is a resin molded body such as, for example, sponge are available.

The filtering membrane has a pore size of the lowermost limit not smaller than 1 μm, although it may vary depending on the purpose of use of the filtering system. If the pore size is too small, clogging will occur frequently and the pressure loss will become large. The uppermost limit of the pore size is 25 μm. If the pore size exceeds this uppermost limit of 25 μm, suspended matter in the filtrate water FW will become highly visible. However, the uppermost limit of the pore size is preferably not greater than 10 μm and more preferably not greater than 5 μm.

The depth filter 10 in the primary filtration unit 4 can be backwashed, and backwashing of the depth filter 10 is effective to allow it to recuperate its filtering capability and, hence, to enable it to be used with no differential pressure increasing during the filtration. In the illustrate embodiment now under discussion, the backwashing is carried out by the use of the compressed air A supplied from the compressor (not shown) through the fluid supplying passage 12. The fluid used in the practice of the present invention may not be necessarily limited to air and any suitable gas such as, for example, nitrogen or a liquid such as, for example, real water or filtered seawater can be employed therefor.

Referring now to FIGS. 1 and 3, the manner of operating the filtering device, that is, the manner of filtrating method by means of the filtration unit designed according to the embodiment will be described hereinafter. As best shown in FIG. 3, a method of operating the filtering device includes a priming step which is a priming step prior to filtering, a filtering step, a pressurizing step and a backwashing step.

When the filtering device 1 is activated by manipulating a start button (not shown) installed in the controller 30, the filtration pump 2 is first started and the first automatic switching valve MV1 and the second automatic switching valve MV2 are opened to start the priming step. During the priming step, the second to fourth automatic switching valves MV2 to MV4 are closed such that in a condition in which the supply of the filtrate water FW from the depth filter 10 towards the secondary filtration unit 26 and the supply of the compressed air towards the depth filter 10 are interrupted, the raw water RW is allowed to flow towards the drain passage 14 through the primary filtration unit 4 and the communication passage 15 and is then discharged to the outside to thereby prime and, hence, remove air from, the raw water passage 5 and the primary filtration unit 4 with the raw water.

Then, the fifth automatic switching valve MV5 is closed and the second automatic switching valve MV2 is opened to initiate the filtering step. During the filtering step, in a condition in which drainage from the depth filter 10 and the supply of the compressed air to the depth filter 10 are interrupted, the raw water RW is supplied to the first filtration unit 4 to enable the filtrate water FW to be supplied to the filtrate water supply passage 8. At this time, the raw water RW flows from outside across the filtering membrane in the depth filter 10 and into the hollow 11 with foreign matter consequently removed from the raw water RW. The filtrate water FW is subsequently supplied through the filtrate water supply passage 8 to the secondary filtration unit 26, where the filtrate water FW is again filtered to thereby provide the treated water TW.

Thereafter, the filtration pump 2 is halted, the first and second automatic switching valves MV1 and MV2 are closed and the automatic switching valve MV3 is opened to thereby initiate the pressurizing step. During the pressurizing step, in a condition in which the supply of the filtrate water FW from the depth filter 10 towards the secondary filtration unit 26 and the supply of the raw water RW towards the depth filter 10 are interrupted, the compressed air A is allowed to flow across the primary filtration unit 4. By so doing, the primary filtration unit 4 is pressurized so that during the subsequent backwashing step, a reverse flow of the filtrate water RW into the fluid supplying passage 12 can be prevented.

After the primary filtration unit 4 has been pressurized as hereinabove described, the backwashing step is initiated by opening the automatic switching valve MV4 with the first and second automatic switching valves MV1 and MV2 held in a closed position. During this backwashing step, in a condition in which the supply of the raw water RW to the primary filtration unit 4 and the supply of the filtrate water FW to the secondary filtration unit 26 are interrupted, the compressed air A is supplied into the hollow 11 of the depth filter 10 to allow the compressed air A, so supplied, to flow into the drain passage 14. By so doing, the compressed air A flows through the depth filter 10 in a direction reverse to that during the filtering step, to remove the foreign matter, trapped by the depth filter 10, from the depth filter 10 and also to remove the foreign matter, deposited within the housing 9, from the housing 9. Those foreign matters so removed are transported out of the primary filtration unit 4 and are then discharged to the outside through the drain passage 14.

After completion of the backwashing step, the third and fourth automatic switching valves MV3 and MV4 are closed, the filtration pump 2 is again started and the first and fifth automatic switching valves 1 and 5 are opened, thereby initiating the priming step. The filtrate water FW immediately after the backwashing and, hence, having been already filtered by the depth filter 10 may sometimes be suspended with ultrafine particles, with which were clogged the pores of the depth filter 10 during the backwashing, and this suspended filtrate water FW is discharged to the outside through the communication passage 15 and then through the drain passage 14.

In the way as described above, the filtering cycle is repeated a desired or required number of times. The time duration during which the priming step is performed can be variably set by a time limiting device such as, for example, a timer. The preset time may vary depending on the size of the filtering device, but may be, for example, 5 seconds. The pressurization may takes place for a short length of time, for example, about 3 seconds and can be variably set by a time limiting device such as, for example, a timer. The time duration during which each of the filtering step and the backwashing step takes place may vary depending on the quality of the raw water to be treated and the size of the filtering device, but may be, for example, about 1 to 5 minutes and can be also variably set by a time limiting device such as, for example, a timer. Transfer from the filtering step to the pressurizing step may be carried out at the time the flow rate Q measured by the flow meter FI exhibits a value smaller than a predetermined value.

During the filtering step, the controller 30 keeps monitoring the flow rate Q at all times and, when the measured flow rate Q exceeds a warning level H1, a warning device such as, for example, a buzzer is triggered on to issue a warning to call the operator's attention. At this time, the filtering device 1 is kept operated. Also, when the measured flow rate Q subsequently increase to a value exceeding an emergency halt level H2, a warning device such as, for example, a bell is triggered on and, at the same time, the filtering device 1 is brought to a halt. More specifically, the controller 30 halts the filtration pump 2 and closes all of the first to fifth automatic switching valves MV1 to MV5.

With the filtering device so constructed as hereinabove described, since the depth filter 10 of a pore size within the range of 1 to 25 μm is employed for the filtering medium, not only can suspended particles of a noticeable size be removed, but also the initial introduction cost can be suppressed as compared with that in the use of a surface filter. Also, the employment of the backwashing is effective to recuperate the filtering capability of the depth filter 10 and, therefore, the frequency of replacement of the depth filter 10 can advantageously be minimized to thereby suppress the cost incurred in maintenance and operation of the filtering device. Yet, since the use has been made of the communication passage 15 fluid connecting the filtrate water supplying passage 8 with the drain passage 14 and the fifth automatic switching valve MV5 for selectively opening or closing this communication passage 15, the filtrate water FW containing the ultrafine particles accumulated immediately after the backwashing can be discharged to the drain passage 14 thereby preventing the suspended filtrate water RW to be supplied.

Also, the depth filter 10 in the primary filtration unit 4 and the hollow fiber membrane in the secondary filtration unit 26 are so backwashed commonly by the compressed air A and, therefore, the equipments can be further simplified.

Since the drain port 22 and the raw water supplying port 18 are the same, the drain port 22 and the raw water supplying port 18 can be commonly shared with each other to allow the structure to be simplified.

According to the above described operating method, since as shown in FIG. 3, the filtrate water FW after the backwashing during the priming step is discharged through the communication passage 15 and then through the drain passage 14, there is no possibility that the filtrate water fW immediately after the backwashing will be suspended.

Yet, since the depth filter 10 is effective to trap material to be filtered in an entire direction of the thickness of the filter in contrast to the surface filter, which trap only on the surface thereof, the amount of the material trapped is large and there is no possibility that filter will be clogged for a substantial length of time.

EXAMPLES

Using the depth filter 10 of the structure described in connection with the preferred embodiment, experiments to verify were conducted. The raw water used was a seawater and the pressure and the flow, both employed in to supplying the raw water, were 0.03 MPa and 0.037 m$^3$/min, respectively. The fluid used in backwashing was a compressed air, and the pressure and the flow, both employed in supplying the compressed air, were 0.13 MPa and 0.4 Nm$^3$/min. The depth filters used was 25 cm in length with the pore size of 1 μm and 25 μm. Also, the depth filter was disposed with its longitudinal axis inclined at an angle of 45° relative to the horizontal plane.

Verification 1

Initial Pressure Loss

Table 1 below illustrates the difference in pressure between the primary and secondary sides of the depth filter of each of 0.5 μm, 1 μm and 25 μm in pore size when at 25° C. the raw water was supplied thereto. As Table 1 makes it clear, the depth filter of the respective pore sizes of 1 μm and 25 μm exhibited a small pressure loss, but the depth filter of the pore size of 0.5 μm exhibited a considerably large pressure loss and almost of the raw water did not flow. Accordingly, the pore size of the depth filter is preferred to be not smaller than 1 μm.

TABLE 1

| Pore Size | Pressure Loss |
|---|---|
| 0.5 μm | 0.03 MPa |
| 1 μm | 0.017 MPa |
| 25 μm | 0.012 MPa |

Verification 2

Effects of Backwashing

Table 2 below illustrates differential pressure statuses of the respective depth filter of 1 μm and 25 μm in pore size. The statuses of each of those depth filter (statuses of differential pressures), when the respective depth filter runs to perform the continuous filtration and when the respective depth filter runs to perform the filtration and the backwashing alternately, are shown. During the alternate filtration and backwashing, the filtration and the backwashing were alternated at intervals of 5 minutes. As for the continuous filtration, the depth filter of 25 μm in pore size exhibited an increase of the differential pressure in about 2 hours whereas the depth filter of 1 μm in pore size exhibited an increase of the differential pressure in about 40 minutes, both of which finally resulted in clogging of the respective depth filter. In contrast thereto, the alternate filtration and backwashing was found to be effective in that no increase of the differential pressure was found in both of the depth filters of 1 μm and 25 μm in pore size when they were run continuously for 5 hours and, hence, no clogging occurred in those depth filters.

TABLE 2

| Pore Size | Continuous Filtration | Alternate Filtration and Backwashing |
|---|---|---|
| 1 μm | Differential pressure increased in about 40 minutes and the filter then clogged. | No differential pressure increased even after 5 hours. |
| 25 μm | Differential pressure increased in about 2 hours and the filter then clogged. | No differential pressure increased even after 5 hours. |

Verification 3

Quality of Filtrate Water

Table 3 below illustrates the numbers of particles of different sizes (underwater particle number) contained in 1 milliliter of each of the raw water and the filtrate water and the rate of removal of those particles, which are exhibited by each of the depth filters of 1 μm and 25 μm in pore size. In Table 3, the denominator represents the underwater particle number in the raw water, the numerator represents the underwater particle number in the filtrate water, and the numerals in the parentheses represent the removal rate.

The depth filter of 25 μm in pore size exhibited removal of 95% or more of the particles of 25 or more μm in particle size, about 88% of the particles of 10 or more μm in particle size, and 60% or more of the particles of 1 or more μm in particle size. Considering that most of the particles of 25 or more μm in particle size have been removed, no suspended particle was noticeable in the filtrate water. Also, the depth filter of 1 μm in pore size exhibited removal of 99% or more of the particles of 25 or more μm in particle size, about 94% of the particles of 10 or more μm in particle size, and 80% or more of the particles of 1 or more μm in particle size.

TABLE 3

| Particle Size | Pore Size: 1 μm | Pore Size: 25 μm |
|---|---|---|
| 1 μm≥ | 3985/(20000 or more) (80%≥) | 7634/(20000 or more) (61%≥) |
| 10 μm≥ | 111/1829 (94%) | 139/1153 (87/9%) |
| 25 μm≥ | 1/249 (99.6%) | 4/94 (95.7%) |

As can readily understood from the result of verification 1 above, since the depth filter 10 employed in the embodiment exhibits almost no pressure loss even in the case of the pore size of 1 μm, the depth filter 10 may have a small projected area and is hence effective to suppress an increase in size of the primary filtration unit 4. Also, as can readily be understood from the result of verification 2 above, the use of the backwashing allows the depth filter to be repeatedly useable. Accordingly, the lifetime can be increased considerably. Yet, as can readily be understood from the result of verification 3 above, the depth filters of 25 μm in pore size is effective to remove 90% or more of the particles of 25 μm or more in particle size or 80% or more of the particles of 10 μm or more in particle size. Accordingly, the pore size of the depth filter 10 may be chosen to be within the range of 1 to 25 μm.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Filtering device (Filtering system)
4 . . . Primary filtration unit
8 . . . Filtrate water supplying passage
9 . . . Housing
10 . . . Depth filter (Filtering medium)
12 . . . Fluid supplying passage
14 . . . Drain passage
15 . . . Communication passage
16 . . . Filtrate water outlet port
18 . . . Raw water supplying port
22 . . . Drain port
24 . . . Gas-supplying port
26 . . . Secondary filtration unit
38 . . . Filtering medium
MV5 . . . Fifth automatic switching valve
A . . . Compressed air
FW . . . Filtrate Water
RW . . . Raw Water

What is claimed is:

1. A filtering device comprising:
a primary filtration unit for filtering a raw water, which unit includes
a filtering medium including a depth filter having a pore size within a range of 1 to 25 μm, and
a housing for accommodating the filtering medium, the housing having defined therein
a port that serves as a raw water supplying port for supplying the raw water into the filtering medium and alternately serves as a drain port for discharging a fluid used for backwashing and the raw water,
a filtrate water outlet port, and
a fluid supplying port for supplying the fluid for backwashing into the filtering medium,
a filtrate passage for discharging filtrate water from the filter;
a conveyance valve disposed on the filtrate passage for conveyance of filtrate water;
a drain passage in fluid connection with the drain port;
a drain valve disposed on the drain passage for passage of the fluid used for backwashing and the raw water;
a communication passage for communicating the filtrate passage with the drain passage, the communication passage branching off from the filtrate passage upstream of the conveyance valve and is in fluid connection with the drain passage;
a switching valve for selectively opening or closing the communication passage; and
a controller that controls the conveyance valve, the switching valve, and the drain valve, and controls the operation of the port in the housing that alternately serves as a raw water supplying port and as the drain port.

2. The filtering device as claimed in claim 1, further comprising a secondary filtration unit for filtering again the filtrate water, which has been filtered by the primary filtration unit, by means of a filtering medium including an ultrafiltration membrane or a reverse osmosis membrane.

3. The filtering device as claimed in claim 1, wherein the fluid supplying port and the filtrate water outlet port are co-located such that use thereof may be alternately switched by the controller.

4. A method of making filtrated water with a filtering device as claimed in claim 1, which comprises:
- a filtering step for supplying raw water from the raw water supplying port to cause the filtrate water to be transported towards the filtrate passage in a condition in which the conveyance valve is open, the drain valve is closed and the supply of the fluid for backwashing from the fluid supplying port is interrupted;
- a backwashing step for supplying the fluid for backwashing from the fluid supplying port and then discharging the fluid from the drain port through the drain passage with the drain valve open and in conditions in which the supply of the filtrate water toward the filtrate passage is interrupted by closing the conveyance valve;
- a priming step for discharging the fluid for backwashing, by supplying raw water from the raw water supply from the raw water supplying port, through the filtrate water outlet port, and through the communication passage and finally through the drain passage, in a condition in which the switching valve is opened while the supply of filtrate water toward the filtrate passage is interrupted by closing conveyance valve and the supply of fluid for backwashing from the backwashing fluid supplying port is interrupted; and
- further starting the filtering step.

* * * * *